April 5, 1932. H. M. LAKE 1,852,420
GRAIN SIEVE
Filed July 7, 1930

Inventor
H. M. Lake
By Lacey & Lacey, Attorneys

Patented Apr. 5, 1932

1,852,420

UNITED STATES PATENT OFFICE

HAROLD M. LAKE, OF GETTYSBURG, SOUTH DAKOTA

GRAIN SIEVE

Application filed July 7, 1930. Serial No. 466,253.

This invention relates to a grain sieve and one object of the invention is to provide a sieve having its bottom or screen so constructed that corn or other grain which is being sieved may easily pass through openings formed in the bottom.

Another object of the invention is to so form the openings in the bottom of the sieve that when the sieve is reciprocated longitudinally grains of corn may easily pass transversely through the openings and to so form portions of the bottom between side edges of the openings that the grains of corn will be guided transversely through the slots as the sieve is reciprocated.

Another object of the invention is to so form the bottom of the screen that when portions thereof between side edges of the slots are bent to form surfaces for guiding corn through the slots the bottom will not be weakened.

Another object of the invention is to permit the bottom or screen of the sieve to be formed from sheet metal and thereby provide a sieve having a bottom which will be simple in construction and very strong and durable.

The invention is illustrated in the accompanying drawings, wherein

Figure 1:
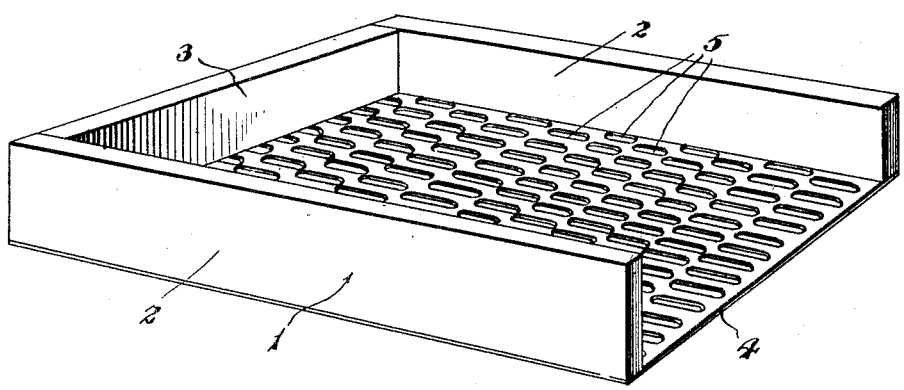
Figure 1 is a perspective view of the improved sieve.
Figure 2:
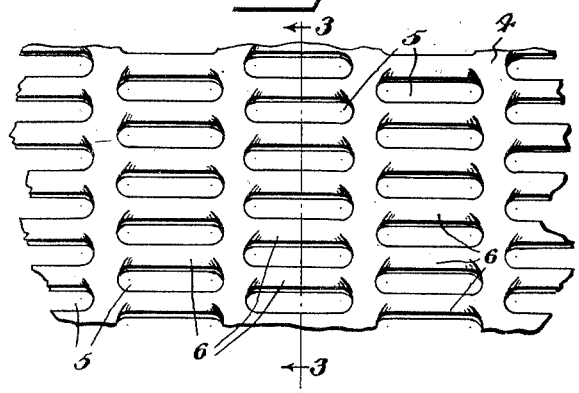
Fig. 2 is an enlarged top plan view of a fragment of the bottom.
Figure 3:
Fig. 3 is a sectional view taken on the line 3—3 of Figure 2.

This improved sieve has a frame 1 which may be formed of wood or any other suitable material. The frame is preferably rectangular in shape and against the lower faces of its side and end bars 2 and 3 is secured a bottom or screen 4 consisting of a sheet of metal corresponding in dimensions to the frame. The sheet metal from which the bottom is formed is of sufficient thickness to provide rigidity and this sheet of metal is stamped to form openings 5 in the form of slots extending longitudinally of the frame. The slots are arranged in rows extending transversely across the bottom, and it should be noted that the slots of each row are disposed in staggered relation to slots of adjoining rows. Therefore, when the sieve is in operation and reciprocated longitudinally, grains of corn moving longitudinally of the bottom will be shifted from one row of slots to another in case they do not pass directly through slots and as they pass from one row of slots to another will be directed towards the slots of the row they are approaching. It should also be noted that the slots of each row extend in spaced parallel relation to each other and are in such spaced relation that the portions of the bottom between side edges of the slots form strips 6 extending the full length of each slot. These strips are twisted each for its full length without the metal at the ends of the strips being severed or torn prior or during the twisting operation and, therefore, the strips will be canted transversely, as shown in Figure 3, and provide surfaces extending at a transverse incline towards the slots. By this arrangement grains of corn or flax resting upon these strips will be disposed at a transverse incline and will have a tendency to slide transversely through the slots. Therefore, as the sieve is reciprocated longitudinally, the grains of corn or flax will be very effectively guided into position for passage through the slots in case they are of the proper size. Grains of corn which are too large to pass through the slots will be retained in the sieve and thereby separated from those of a size to pass through the slots. Also small pieces of cob and other trash will be retained in the sieve to pass over the tail end thereof.

Figure 4:
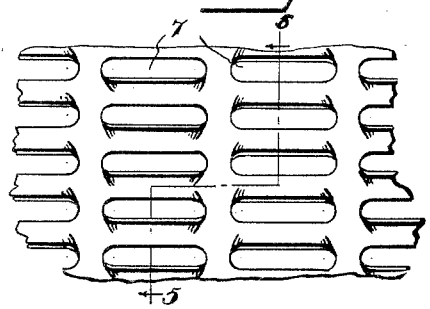
Fig. 4 is a view similar to Figure 2 illustrating a modified form of sieve bottom.
Figure 5:
Fig. 5 is a sectional view taken on the line 5—5 of Figure 4.

In Figures 4 and 5, there has been illustrated a modified form of sieve bottom. In this form of the invention, the slots 7 of each row are alined with the slots of adjoining rows but the strips 8 between slots of each row extend at a transverse incline in a direction opposite to the strips of adjoining rows. This is clearly shown in Figure 5 where the strips of one row slope transversely in an opposite direction to strips of the other row. By this arrangement corn and other seed which fail to pass through slots of one row will be moved transversely in an opposite direction upon reaching the next row of slots and guided through the slots thereof.

It is observed that the openings 5 or 7 are elongated and in the plane of the sheet 4 which is flat throughout its extent. The openings of each row are parallel and regularly spaced and the portions between adjacent openings are laterally inclined throughout their extent to provide deflecting surfaces for the grain. These deflecting surfaces extend above and below the plane of the sheet and the openings therein, as shown most clearly in Figs. 3 and 5 of the drawings.

Having thus described the invention, I claim:

In a grain sieve, a frame to have reciprocating motion imparted thereto, and a bottom for said frame consisting of a flat sheet having parallel rows of slots formed therein, the rows being spaced transversely from each other and extending transversely of the direction in which the frame reciprocates, the slots of each row extending longitudinally of the direction in which the frame reciprocates and being parallel to each other, the portions of the sheet between the slots of each row being of an even width and the portions only between the slots in each row being bent laterally throughout the extent of each slot to extend at an incline from one slot to another and provide deflecting surfaces between adjacent slots extending transversely of the direction in which the frame reciprocates at an angle of substantially 90° thereto and projecting above and below the plane of the sheet, the inclination of the deflecting surfaces of one row being the reverse of the inclination of the deflecting surfaces of adjacent rows.

In testimony whereof I affix my signature.

HAROLD M. LAKE.